Jan. 11, 1927.
C. MARCH
HANDLE SUPPORT
Filed May 19, 1926
1,613,667
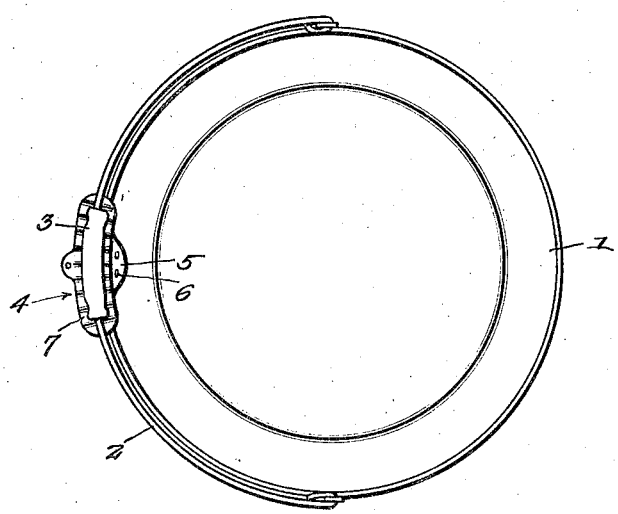
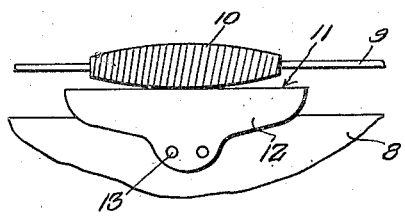
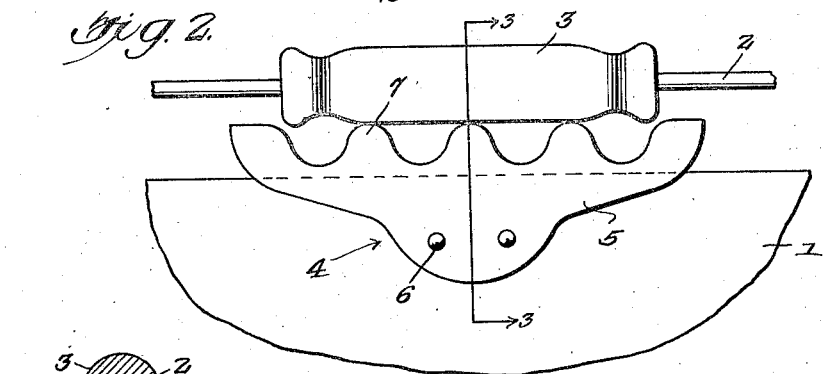
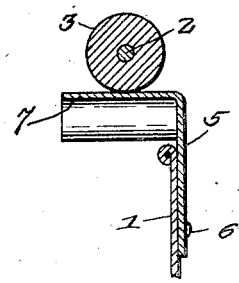
Inventor
Carl March,
By Clarence A. O'Brien
Attorney Patented Jan. 11, 1927.

1,613,667

UNITED STATES PATENT OFFICE.

CARL MARCH, OF CHICAGO, ILLINOIS.

HANDLE SUPPORT.

Application filed May 19, 1926. Serial No. 110,248.

This invention relates to what may be referred to as a handle supporting device, and it has more particular reference to a small attachment adapted for disposition on the upper edge of a cooking utensil, for example, a pot.

It has been noticed that where utensils of this class are provided with the usual swingably mounted bail and the central hand grip, when the pot is rested on the stove burner and the bail is released, the hand grip drops down against one side wall of the pot, if it is of wood, it frequently burns and if of metal, it gets too hot to handle with the bare hand. This is also true of a wooden hand grip.

What I propose, is a simple and inexpensive attachment for the upper edge of the pot which constitutes a novel rest for the hand grip.

The specific construction of the attachment will be made plain from the following description and drawing.

In the drawing:—

Figure 1 is a top plan view of a pot of conventional design equipped with one embodiment of the invention.

Figure 2 is an enlarged view of the attachment shown in Figure 1.

Figure 3 is a section taken on the line 3—3 of Figure 2, and

Figure 4 is a view showing a slightly different embodiment of the invention.

Attention is first confined more particularly to Figures 1 to 3 inclusive wherein it will be seen that the reference character 1 designates generally a cooking utensil such as a pot and the same is of a conventional configuration. As is usual, it is provided with a substantially semi-circular wire bail having a centrally disposed hand grip 3 of suitable design. The attachment is designated generally by the reference character 4 and as plainly shown, it includes an attaching flange 5 riveted at 6 to the side wall of the utensil as plainly indicated in Figure 3. The flange extends above the upper edge of the rim of the utensil and terminates in a horizontal ledge 7 which is here shown as provided with transverse corrugations. I would direct attention to the fact, however, that the corrugations need not be transverse but may extend longitudinally if desired. With this arrangement it will be seen that when the wire bail 2 is released, the hand grip 3 will rest upon the ledge, and the corrugations will afford spaces for circulation of air about the handle to prevent it from becoming unduly hot. As a matter of fact, by simply resting the hand grip on this attachment, the wire bail will be held in such a position as to prevent overheating and burning of the hand grip. Moreover, the corrugations when disposed as shown will permit the fingers to be readily inserted in the hand grip for lifting the bail up when it is desired to remove the pot from the stove.

In Figure 4 substantially the same arrangement is shown wherein the reference character 8 designates the pot, 9 the bail, and 10 a metal hand grip. Here the attachment is represented by the reference character 11 and it includes an attaching flange 12 of the same configuration secured in place by rivets 13. In this arrangement however, the top ledge is of flat formation. Otherwise it is identical and operates in the same way as the attachment before described.

No doubt the advantages and constructional features of an invention of this kind have made clear and a more lengthy description is therefore thought unnecessary.

Minor changes coming within the field of invention claimed may be resorted to if desired.

Having thus described the invention, what I claim as new and desire to secure by Letters Patent is:—

1. As a new article of manufacture, an attachment for the wall of a cooking utensil comprising a single metal stamping including portions bent into right angular formation, one portion constituting an attaching flange, adapted to be secured to the wall of the cooking utensil, the other portion forming a horizontal ledge adapted to extend at right angles to said wall, said flange to be spaced above the upper edge of said wall, and operating to provide a rest for the hand-grip of a supporting bail for said utensils.

2. As a new product of manufacture, an attachment for the wall of a cooking utensil comprising a single metal stamping having portions bent into right angular relationship, one portion forming an attaching flange and the other portion forming a hand grip supporting leg, the latter being provided with transverse corrugations.

In testimony whereof I affix my signature.

CARL MARCH.